United States Patent
Zimmerman, Jr. et al.

(10) Patent No.: US 6,379,749 B2
(45) Date of Patent: Apr. 30, 2002

(54) METHOD OF REMOVING CERAMIC COATINGS

(75) Inventors: Robert George Zimmerman, Jr., Morrown; William Clarke Brooks, Lebanon; Roger Dale Wustman, Loveland; John Douglas Evans, Sr., Springfield, all of OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/730,373

(22) Filed: Dec. 5, 2000

Related U.S. Application Data

(63) Continuation-in-part of application No. 09/487,986, filed on Jan. 20, 2000, now Pat. No. 6,238,743.

(51) Int. Cl.[7] .............................. B05D 3/10; C23G 1/00
(52) U.S. Cl. ......................... 427/307; 427/309; 134/2; 134/3; 216/100; 216/101
(58) Field of Search .................................. 427/307, 309, 427/327, 453; 134/2, 3, 26, 28, 29; 216/96, 100, 101; 252/79.1

(56) References Cited

U.S. PATENT DOCUMENTS

| | | | |
|---|---|---|---|
| 3,847,688 A | 11/1974 | Gillice | 156/2 |
| 4,181,623 A | 1/1980 | Dillarstone et al. | 252/143 |
| 4,652,513 A | 3/1987 | Pentak et al. | 430/258 |
| 4,759,823 A | * 7/1988 | Asselanis et al. | 156/659.1 |
| 5,614,054 A | 3/1997 | Reeves et al. | 156/344 |
| 6,048,406 A | 4/2000 | Misra et al. | 134/2 |
| 6,238,743 B1 | * 5/2001 | Brooks | 427/307 |

* cited by examiner

*Primary Examiner*—Michael Barr
(74) *Attorney, Agent, or Firm*—V. Ramaswamy; Hartman and Hartman, P.C.

(57) ABSTRACT

A method of removing a ceramic coating (18), and particularly zirconia-containing thermal barrier coating (TBC) materials such as yttria-stabilized zirconia (YSZ), that has been either intentionally or unintentionally deposited on the surface of a component (10). The method entails subjecting the ceramic coating (18) to an aqueous solution containing an acid fluoride salt, such as ammonium bifluoride ($NH_4HF_2$) or sodium bifluoride ($NaHF_2$), and a corrosion inhibitor. The method is capable of completely removing the ceramic coating (18) without removing or damaging the underlying substrate material, which may include a metallic bond coat (16).

20 Claims, 1 Drawing Sheet

METHOD OF REMOVING CERAMIC COATINGS

This patent application is a continuation-in-part of U.S. Ser. No. 09/487,986, filed Jan. 20, 2000, now U.S. Pat. No. 6,238,743.

FIELD OF THE INVENTION

The present invention relates to methods for removing ceramic coatings. More particularly, this invention is directed to a method for removing a layer of a zirconia-containing ceramic layer, such as a thermal barrier coating of yttria-stabilized zirconia (YSZ), from a surface, such as that of tooling of a deposition apparatus or that of a component of a gas turbine engine.

BACKGROUND OF THE INVENTION

Components located in certain sections of gas turbine engines, such as the turbine, combustor and augmentor, are often thermally insulated with a ceramic layer in order to reduce their service temperatures, which allows the engine to operate more efficiently at higher temperatures. These coatings, often referred to as thermal barrier coatings (TBC), must have low thermal conductivity, strongly adhere to the article, and remain adherent throughout many heating and cooling cycles.

Coating systems capable of satisfying the above requirements typically include a metallic bond coat that adheres the TBC to the component. Bond coats are typically formed of an oxidation-resistant diffusion coating such as a diffusion aluminide or platinum aluminide, or an oxidation-resistant overcoat alloy such as MCrAlY (where M is iron, cobalt and/or nickel). Metal oxides, such as zirconia ($ZrO_2$) partially or fully stabilized by yttria ($Y_2O_3$), magnesia (MgO) or other oxides, have been widely employed as TBC materials. TBC is typically deposited by flame spraying, air plasma spraying (APS), low pressure plasma spraying (LPPS), or a physical vapor deposition (PVD) technique such as electron beam physical vapor deposition (EBPVD), which yields a strain-tolerant columnar grain structure. These coating techniques require tooling to position, rotate and mask components being coated, such that the coating process can be controlled to shield or coat selected portions of the components.

Though significant advances have been made with coating materials and processes for producing both the environmentally-resistant bond coat and the TBC, there is the inevitable requirement to remove and replace the TBC under certain circumstances. For example, removal may be necessitated by erosion or impact damage to the TBC during engine operation, or by a requirement to repair certain features such as the tip length of a turbine blade. Removal of the TBC may also be necessitated during component manufacturing to address such problems as defects in the coating, handling damage and the need to repeat noncoating-related manufacturing operations which require removal of the ceramic, e.g., electrical-discharge machining (EDM) operations. Because the equipment, tooling and maskants employed in the deposition of TBC tend to become coated with the TBC material, a need also arises to periodically remove TBC from these components in order to ensure their proper function and operation. As an example, unwanted TBC must often be removed from maskants after only a few coating cycles.

Current state-of-the-art methods for repairing components protected by TBC often result in removal of the entire TBC system, i.e., both the ceramic TBC and the bond coat, after which the bond coat and TBC must be redeposited. One such method is to use abrasives in procedures such as grit blasting, vapor honing and glass bead peening, each of which is a slow, labor-intensive process that erodes the TBC and bond coat, as well as the substrate surface beneath the bond coat. With repetitive use, these procedures eventually destroy the component by reducing the wall thickness of the component. This disadvantage is particular acute with diffusion aluminide bond coats, which have a diffusion zone that extends into the substrate surface of the component. Damage to diffusion aluminide bond coats generally occurs by the fracturing of brittle phases in the diffusion zone, such as $PtAl_2$ phases of a platinum-aluminide bond coat, or in the additive layer, which is the outermost bond coat layer containing an environmentally-resistant intermetallic phase MAl, where M is iron, nickel or cobalt, depending on the substrate material. Damage is particularly likely when treating an air-cooled component, such as a turbine blade or vane whose airfoil surfaces include cooling holes from which cooling air is discharged to cool its external surfaces.

With respect to the removal of TBC from tooling, the requirement that TBC be repeatedly removed to maintain the operability of the tooling drastically shortens the life of the tooling, leading to frequent tooling replacement. Because of the high temperature processes used to deposit TBC, tooling is often formed of superalloy materials, such as Hastelloy X, with the result that tooling replacement costs can be high.

In view of the above, significant effort has been directed to developing nonabrasive processes for removing TBC. One such method is an autoclaving process in which the TBC is subjected to elevated temperatures and pressures in the presence of a caustic compound. This process has been found to sufficiently weaken the chemical bond between the TBC and bond coat layers to permit removal of the TBC while leaving the bond coat intact. However, suitable autoclaving equipment is expensive, and autoclaving techniques have been incapable of removing ceramic from the cooling holes of air-cooled turbine blades and vanes. Consequently, cooling holes are likely to become constricted when new TBC is deposited, which is detrimental to the performance of the component. Other known techniques for removing TBC from coater tooling and gas turbine engine components include fluoride ion cleaning and high temperature treatments with chloride. However, each of these techniques generally has the disadvantage of being slow, which significantly limits throughput and results in relatively long turn-around times.

A more rapid technique for removing TBC is disclosed in U.S. Pat. No. 5,614,054 to Reeves et al., and employs a halogen-containing powder or gas, preferably ammonium fluoride ($NH_4F$). Reeves et al. treat the surface of a TBC-coated component at a temperature sufficient to yield halogen ions that are believed to attack the metal oxide bond between the TBC and the bond coat. Reeves et al. note that aluminide bond coats are degraded by this treatment, though the underlying superalloy substrate remains unharmed. While Reeves et al. represent a significant advancement in TBC removal, further improvements are desired, particularly for processes capable of removing TBC from a component surface without damaging the underlying substrate, including any bond coat used to adhere the TBC.

SUMMARY OF THE INVENTION

The present invention provides a method of removing a ceramic coating, and particularly zirconia-containing thermal barrier coating (TBC) materials such as yttria-stabilized zirconia (YSZ), that has been either intentionally or unintentionally deposited on the surface of a component. As such, TBC materials with or without a metallic bond coat can be removed by the process of this invention, as bond coats are typically not present on equipment, tooling and maskants used to deposit TBC materials, while bond coats are a preferred constituent on the surfaces of high temperature components in order to tenaciously adhere the TBC to the component, notable examples of which include gas turbine engine components exposed to the hostile thermal environment of the turbine, combustor and augmentor sections of a gas turbine engine. The method is particularly suited for completely removing the TBC without removing or damaging the metallic bond coat, if present, or damaging the underlying substrate material.

The method of this invention generally entails subjecting the TBC to an aqueous solution containing an acid fluoride salt, such as ammonium bifluoride ($NH_4HF_2$) or sodium bifluoride ($NaHF_2$), and a corrosion inhibitor. A preferred process for removing the ceramic coating entails immersing the component in the solution while maintained at an elevated temperature, and subjecting the coating to ultrasonic energy. Using the method of this invention, a TBC can be completely removed from the component and any surface holes, such as cooling holes often present in the airfoil surfaces of gas turbine engine components, and with essentially no degradation of a bond coat (if present) or substrate beneath the TBC. Therefore, the method of this invention can be used repetitively without eventually destroying the component or equipment from which the TBC is removed.

In view of the above, the present invention is particular suitable for removing TBC from gas turbine engine components and the thick TBC that accumulates on equipment, tools and maskants used to apply TBC on such components. This invention also allows the deposition of a new TBC on components intended to be thermally insulated with TBC without necessitating refurbishment or replacement of the bond coat and without depositing additional ceramic in any surface holes, e.g., cooling holes. If the component was previously in service, such that the bond coat has been partially depleted as a result of oxidation, the bond coat can be refurbished before replacing the TBC. A significant advantage of this invention is therefore the reduced labor, equipment and processing costs required to refurbish components insulated with TBC and to remove unwanted TBC from the equipment, tooling and maskants used to deposit TBC on such components. In addition, the service life of a component can also be extended by avoiding replacement of its entire TBC system, since removal of a bond coat results in loss of wall thickness, particularly if the bond coat is a diffusion aluminide that inherently shares a significant diffusion zone with the component substrate.

Another advantage of the present invention is that prior art techniques for removing TBC have typically been unable to remove TBC from the cooling holes of air-cooled components, or have caused excessive damage to the bond coat in the process of removing the TBC. With the ability to completely remove TBC from the cooling holes of an air-cooled component without damaging the underlying bond coat, the performance of the component is improved by the ability to restore the TBC to its original thickness, thereby reestablishing the desired film cooling effect at the component surface.

Other objects and advantages of this invention will be better appreciated from the following detailed description.

DETAILED DESCRIPTION OF THE INVENTION

Figure 1:
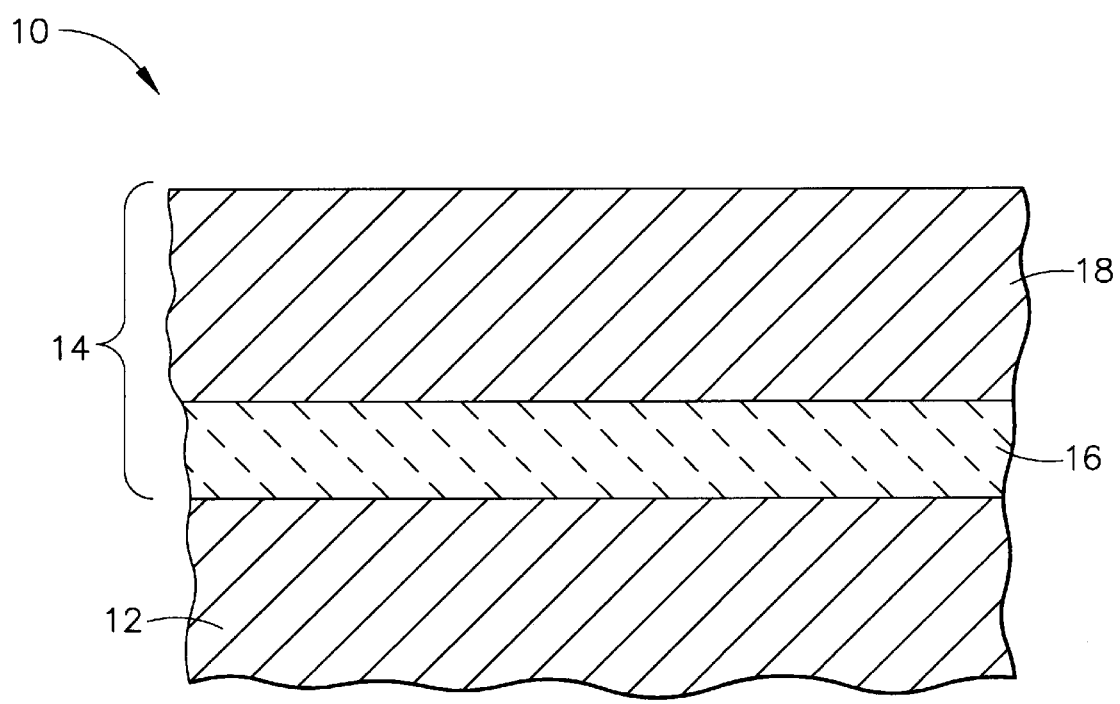
FIG. 1 is a sectional view of a surface portion of a gas turbine engine blade protected by a thermal barrier coating system that includes a TBC adhered to the blade surface with a bond coat.

FIG. 1 represents a partial cross-sectional view of an airfoil portion of a gas turbine engine turbine component 10, such as a blade or vane. The substrate 12 of the component 10 is shown as being protected by a thermal barrier coating system 14 composed of a TBC 18 adhered to the substrate 12 by a bond coat 16. The method of this invention is directed to removing the TBC 18 from the substrate 12 of the component 10 without removing or damaging the bond coat 16. As will be discussed below, the method of this invention is also directed to removing TBC unintentionally deposited on the equipment, tooling and maskants (hereinafter referred to as "tooling") used to deposit TBC on components.

As is the situation with high temperature components of a gas turbine engine, the component 10 may be formed of an iron, nickel or cobalt-base superalloy. The bond coat 16 is an oxidation-resistant composition such as a diffusion aluminide and/or MCrAlY, both of which form an alumina ($Al_2O_3$) layer or scale (not shown) on its surface during exposure to elevated temperatures. The alumina scale protects the underlying superalloy substrate 12 from oxidation and provides a surface to which the TBC 18 more tenaciously adheres. The TBC 18 can be deposited by flame spraying, air plasma spraying (APS), low pressure plasma spraying (LPPS) or a physical vapor deposition technique, e.g., electron beam physical vapor deposition (EBPVD), which yields a strain-tolerant columnar grain structure (not shown). A preferred material for the TBC 18 is zirconia partially stabilized with yttria (yttria-stabilized zirconia, or YSZ), though zirconia fully stabilized with yttria could be used, as well as zirconia stabilized by other oxides, such as magnesia (MgO), calcia (CaO), ceria ($CeO_2$) or scandia ($Sc_2O_3$).

The method of this invention entails removing the TBC 18 without removing or damaging the bond coat 16 or the underlying superalloy substrate 12, so that new TBC can be deposited on the original bond coat 16. According to this invention, the TBC 18 is preferentially removed by exposure to an aqueous stripping solution containing an acid fluoride salt, namely ammonium bifluoride ($NH_4HF_2$) or sodium bifluoride ($NaHF_2$), and a corrosion inhibitor. A suitable composition for the aqueous solution is about 20 to about 100 grams of the acid fluoride salt per liter of water, and up to about 0.5 volume percent of the corrosion inhibitor. While not required, distilled or de-ionized water is preferred. Various corrosion inhibitors were evaluated in the course of arriving at the present invention, with the result that a particularly preferred inhibitor was identified as containing sulfuric acid ($H_2SO_4$), 1,3-diethylthiourea ($C_2H_5NHCSNHC_2H_5$) and alkyl pyridines (e.g., ethylpyridine, methylpyridine, propylpyridine, etc.). A suitable corrosion inhibitor is commercially available under the name RODINE® 31A from Henkel Surface Technologies of Madison Heights, Mich. USA, and contains about 10 to about 30 volume percent sulfuric acid, about 10 to about 30 volume percent 1,3-diethylthiourea, and about 30 to about 60 volume percent of a mixture of alkyl pyridines. A preferred composition for the stripping solution using the RODINE® 31A corrosion inhibitor is about 45 to about 55 grams of ammonium bifluoride per liter of water, to which is added about 0.2 to about 0.4 volume percent RODINE® 31A. While not wishing to be held to any particular theory, it is believed that the acid fluoride salt attacks zirconia, converting it to zirconium fluoride, while the corrosion inhibitor behaves in a manner similar to a passivator, protecting the metallic material beneath the TBC 18 and the oxide scale.

The surface of the component 10 is preferably treated with the stripping solution at an elevated temperature. A suitable temperature range is about 140° F. to about 170° F. (about 60° C. to about 77° C.), more preferably about 140° F. to about 155° F. (about 60° C. to about 68° C.). The stripping treatment of this invention also preferably includes the use of ultrasonic energy transmitted through the solution to the TBC 18. Frequencies of about 20 kHz to 40 kHz have been found suitable for ultrasonic energy levels of about 50 to about 200 W per gallon (about four liters) of solution. The ultrasonic treatment can be continued until the TBC 18 is completely removed or at least sufficiently loosened so that it can be removed by brushing or pressure spray rinsing, typically after an exposure of about two to five hours. Without ultrasonic treatment, a total treatment duration of about four to about five hours is generally sufficient to weaken the chemical bond between the TBC 18 and the alumina scale on the bond coat 16. It is foreseeable that longer or shorter durations may be preferred, depending on the properties of the particular coating system.

In practice, the stripping solution of this invention has been used to remove YSZ TBC from nickel-base superalloy airfoils without damaging an underlying platinum aluminide bond coat. Notably, TBC within the cooling holes of the airfoils was also removed, while portions of the bond coats within the holes and coated by the TBC, as well as uncoated bond coat within internal cooling passages of the airfoils, were not attacked. Following the treatment, the airfoils were successfully recoated with TBC without requiring any refurbishing of the bond coat. Because the stripping process of this invention completely removed the TBC from the cooling holes, the thermal performance of the airfoils was not impaired by the accumulation of excess TBC in the cooling holes. Furthermore, because the stripping process of this invention did not damage any portions of the bond coats, additional processing steps to repair or replace the bond coats were unnecessary. If the blades had been in service, such that the bond coats were partially depleted as a result of oxidation, the bond coats, whether a diffusion aluminide or MCrAlY-type, could be refurbished prior to TBC deposition using a diffusion aluminizing technique such as pack cementation or vapor phase aluminizing.

The stripping solution of this invention has also been used to strip YSZ TBC from tooling used in PVD coaters. The tooling was formed of the nickel-base superalloy Hastelloy X, and the TBC was stripped at a rate of about 0.003 to 0.005 inch per hour (about 75 to about 125 micrometers per hour) without any apparent degradation of the substrate.

While the invention has been described in terms of a preferred embodiment, it is apparent that other forms could be adopted by one skilled in the art. Therefore, the scope of the invention is to be limited only by the following claims.

What is claimed is:

1. A method of removing at least a portion of a zirconia-containing ceramic coating from a metallic substrate, the method comprising the step of subjecting the portion of the ceramic coating to an aqueous solution comprising an acid fluoride salt and a corrosion inhibitor, the acid fluoride salt being present in the aqueous solution in an amount sufficient to attack the ceramic coating, the corrosion inhibitor being present in the aqueous solution in an amount sufficient to protect the metallic substrate from attack by the acid fluoride salt.

2. A method according to claim 1, wherein the acid fluoride salt is ammonium bifluoride.

3. A method according to claim 1, wherein the corrosion inhibitor comprises sulfuric acid and 1,3-diethylthiourea.

4. A method according to claim 1, wherein the corrosion inhibitor comprises about 10 to about 30 volume percent sulfuric acid, about 10 to about 30 volume percent 1,3-diethylthiourea, and about 30 to about 60 volume percent of a mixture of alkyl pyridines.

5. A method according to claim 1, wherein the subjecting step further comprises directing ultrasonic energy at the ceramic coating while the ceramic coating is subjected to the solution.

6. A method according to claim 1, wherein the solution comprises about 20 to about 100 grams of the acid fluoride salt per liter of water, and up to about 0.5 volume percent of the corrosion inhibitor.

7. A method according to claim 1, wherein the solution comprises about 45 to about 55 grams of the acid fluoride salt per liter of water, and about 0.2 to about 0.4 volume percent of the corrosion inhibitor.

8. A method according to claim 1, wherein the solution consists essentially of about 20 to about 100 grams of the acid fluoride salt per liter of water, and up to about 0.5 volume percent of the corrosion inhibitor.

9. A method according to claim 1, wherein the solution consists essentially of about 45 to about 55 grams of the acid fluoride salt per liter of water, and about 0.2 to about 0.4 volume percent of the corrosion inhibitor.

10. A method according to claim 1, wherein the subjecting step further comprises heating the metallic substrate and the solution to about 60° C. to about 77° C. for a duration of at least two hours.

11. A method according to claim 1, wherein the metallic substrate is that of tooling of a deposition apparatus and the ceramic coating was deposited on the tooling by the deposition apparatus.

12. A method according to claim 1, wherein the metallic substrate is that of a component of a gas turbine engine.

13. A method according to claim 12, wherein the metallic substrate comprises a metallic bond coat adhering the ceramic coating to the component, and wherein the solution does not remove the bond coat.

14. A method according to claim 13, further comprising the step of depositing a ceramic material on the metallic substrate of the component after the portion of the ceramic coating is removed.

15. A method of removing an yttria-stabilized zirconia layer from a metallic substrate of a component without damaging the metallic substrate of the component, the method comprising the step of immersing the component in an aqueous solution consisting essentially of about 20 to about 100 grams ammonium bifluoride per liter of water, and a corrosion inhibitor comprising about 10 to about 30 volume percent sulfuric acid, about 10 to about 30 volume percent 1,3-diethylthiourea, and about 30 to about 60 volume percent of a mixture of alkyl pyridines, the corrosion inhibitor being present in the aqueous solution in an amount sufficient to protect the metallic substrate from attack by the ammonium bifluoride.

16. A method according to claim 15, wherein the solution consists essentially of about 45 to about 55 grams ammonium bifluoride per liter of water, and about 0.2 to about 0.4 volume percent of the corrosion inhibitor.

17. A method according to claim 15, wherein the subjecting step further comprises heating the metallic substrate and the solution to about 60° C. to about 68° C. for a duration of at least two hours.

18. A method according to claim 15, wherein the subjecting step further comprises directing ultrasonic energy at the yttria-stabilized zirconia layer while the metallic substrate is subjected to the solution.

19. A method according to claim 15, wherein the metallic substrate is that of tooling of a deposition apparatus and the yttria-stabilized zirconia layer was deposited on the tooling by the deposition apparatus.

20. A method according to claim 15, wherein the metallic substrate is that of a component of a gas turbine engine, the metallic substrate comprises a metallic bond coat adhering the yttria-stabilized zirconia layer to the component, and the solution does not remove the bond coat, the method further comprising the step of depositing a yttria-stabilized zirconia coating on the metallic substrate of the component after the portion of the yttria-stabilized zirconia layer is removed.

* * * * *